(12) United States Patent
Perez et al.

(10) Patent No.: US 8,542,252 B2
(45) Date of Patent: Sep. 24, 2013

(54) TARGET DIGITIZATION, EXTRACTION, AND TRACKING

(75) Inventors: Kathryn Stone Perez, Shoreline, WA (US); Alex Kipman, Redmond, WA (US); Nicholas Burton, Hemington (GB); Andrew Wilson, Ashby de la Zouch (GB); Diego Fernandes Nehab, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 12/455,192

(22) Filed: May 29, 2009

(65) Prior Publication Data

US 2010/0302247 A1 Dec. 2, 2010

(51) Int. Cl.
| G06T 17/00 | (2006.01) |
| G09G 5/00 | (2006.01) |
| G06K 9/00 | (2006.01) |
| G06K 9/46 | (2006.01) |

(52) U.S. Cl.
USPC ............ 345/649; 345/420; 382/102; 382/203

(58) Field of Classification Search
USPC .................... 382/102, 203; 345/420, 649
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Qian et al., "A Gesture-Driven Multimodal Interactive Dance System", IEEE International Conference on Multimedia and Expo, Taipei, Jun. 2004, 3, 1579-1582.

(Continued)

*Primary Examiner* — Aaron M Richer
*Assistant Examiner* — Robert Craddock
(74) *Attorney, Agent, or Firm* — Woodcock Washburn, LLP

(57) ABSTRACT

Techniques may comprise identifying surfaces, textures, and object dimensions from unorganized point clouds derived from a capture device, such as a depth sensing device. Employing target digitization may comprise surface extraction, identifying points in a point cloud, labeling surfaces, computing object properties, tracking changes in object properties over time, and increasing confidence in the object boundaries and identity as additional frames are captured. If the point cloud data includes an object, a model of the object may be generated. Feedback of the model associated with a particular object may be generated and provided real time to the user. Further, the model of the object may be tracked in response to any movement of the object in the physical space such that the model may be adjusted to mimic changes or movement of the object, or increase the fidelity of the target's characteristics.

29 Claims, 10 Drawing Sheets
(2 of 10 Drawing Sheet(s) Filed in Color)

(56) References Cited

U.S. PATENT DOCUMENTS

| | | |
|---|---|---|
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,278,460 B1 * | 8/2001 | Myers et al. .................. 345/424 |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 * | 1/2004 | Jojic et al. .................. 382/103 |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 * | 12/2007 | Fujimura et al. .............. 382/103 |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,433,024 B2 * | 10/2008 | Garcia et al. .................. 356/4.01 |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |

| | | |
|---|---|---|
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2004/0170317 A1* | 9/2004 | Pettigrew et al. ............ 382/162 |
| 2004/0207597 A1 | 10/2004 | Marks |
| 2005/0059488 A1 | 3/2005 | Larsen et al. |
| 2006/0188144 A1 | 8/2006 | Sasaki et al. |
| 2006/0239558 A1 | 10/2006 | Rafii et al. |
| 2007/0013718 A1* | 1/2007 | Ohba ............................ 345/629 |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1* | 6/2008 | Fujimura et al. ............ 382/103 |
| 2008/0215972 A1 | 9/2008 | Zalewski et al. |
| 2008/0215973 A1 | 9/2008 | Zalewski et al. |
| 2009/0141933 A1 | 6/2009 | Wagg |
| 2009/0167679 A1 | 7/2009 | Klier et al. |
| 2009/0221368 A1 | 9/2009 | Yen et al. |
| 2010/0093435 A1 | 4/2010 | Glaser et al. |

FOREIGN PATENT DOCUMENTS

| | | |
|---|---|---|
| JP | 08044490 A | 2/1996 |
| WO | WO 93/10708 A1 | 6/1993 |
| WO | WO 97/17598 A1 | 5/1997 |
| WO | WO 99/15863 A1 | 4/1999 |
| WO | WO 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

"Virtual High Anxiety", Tech Update, Aug. 1995, pp. 22.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Cambridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "CONDENSATION—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Cambridge, MA.

Zhao, "Dressed Human Modeling, Detection, and Parts Localization", 2001, The Robotics Institute, Carnegie Mellon University, Pittsburgh, PA.

\* cited by examiner

TARGET DIGITIZATION, EXTRACTION, AND TRACKING

BACKGROUND

Many computing applications such as computer games, multimedia applications, or the like include avatars or characters that are animated using typical motion capture techniques. For example, when developing a golf game, a professional golfer may be brought into a studio having motion capture equipment including, for example, a plurality of cameras directed toward a particular point in the studio. The professional golfer may then be outfitted in a motion capture suit having a plurality of point indicators that may be configured with and tracked by the cameras such that the cameras may capture, for example, golfing motions of the professional golfer. The motions can then applied to an avatar or character during development of the golf game. Upon completion of the golf game, the avatar or character can then be animated with the characteristics and motions of the professional golfer during execution of the golf game. Unfortunately, typical motion capture techniques are costly, tied to the development of a specific application, and do not include motions associated with an actual player or user of the application. Furthermore, typically motion capture techniques do not identify and track the various concepts of the player's/user's environment. Current techniques are brute force techniques that have not been combined in such a sophisticated manner that objects in a physical space may be digitized, extracted, and tracked in real time and provided on a display to a user in real time.

SUMMARY

Disclosed herein are techniques for target digitization that can be used to identify and track objects in a scene and provide real-time feedback to a user. The techniques comprise identifying surfaces, textures, and object dimensions from organized ooint clouds derived from a capture device, such as a depth sensing device. Employing target digitization may comprise surface extraction, identifying points in a point cloud, computing surfaces, computing object properties, tracking changes in object properties over time, and increasing confidence in the object boundaries and identity as additional frames are captured.

For example, a point cloud of data points related to objects in a physical space may be received or observed. The point cloud may then be analyzed to determine whether the point cloud includes an object or multiple objects. A collection of points in the cloud may be identified as an object and fused together to represent a single object. The surface of each object may be extracted from the point cloud.

If the data includes an object, a model of the object may be generated. An increase in confidence in the object identification may occur as frames are captured. Feedback of the model associated with a particular object may be generated and provided real time to the user. Further, the model of the object may be tracked in response to any movement of the object in the physical space such that the model may be adjusted to mimic the movement of the object.

The techniques provide the ability to scan a known/unknown object, scan a human, and scan background aspects in a scene (e.g., floors, walls). The scan data for each, which may include a combination of depth and RGB data, may be used to create a three-dimensional model of the object. The RGB data is applied to the corresponding area of the model. Temporal tracking, from frame to frame, can increase confidence and adapt the object data in real-time. Thus, the object properties and tracking of changes in the object properties over time may be used to reliably track objects that change in position and orientation from frame to frame in real time. The capture device captures data at interactive rates, increasing the fidelity of the data and allowing the disclosed techniques to process the raw depth data, digitize the objects in the scene, extract the surface and texture of the object, and perform any of these techniques in real-time such that the display can provide a real-time depiction of the scene.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for a gesture recognizer system architecture in accordance with this specification are further described with reference to the accompanying drawings. The patent or application contains at least one drawing executed in color. Copies of this patent or application publication with color drawing(s) will be provided by the Office upon request and payment of the necessary fee.

DETAILED DESCRIPTION OF ILLUSTRATIVE EMBODIMENTS

Figure 1A:
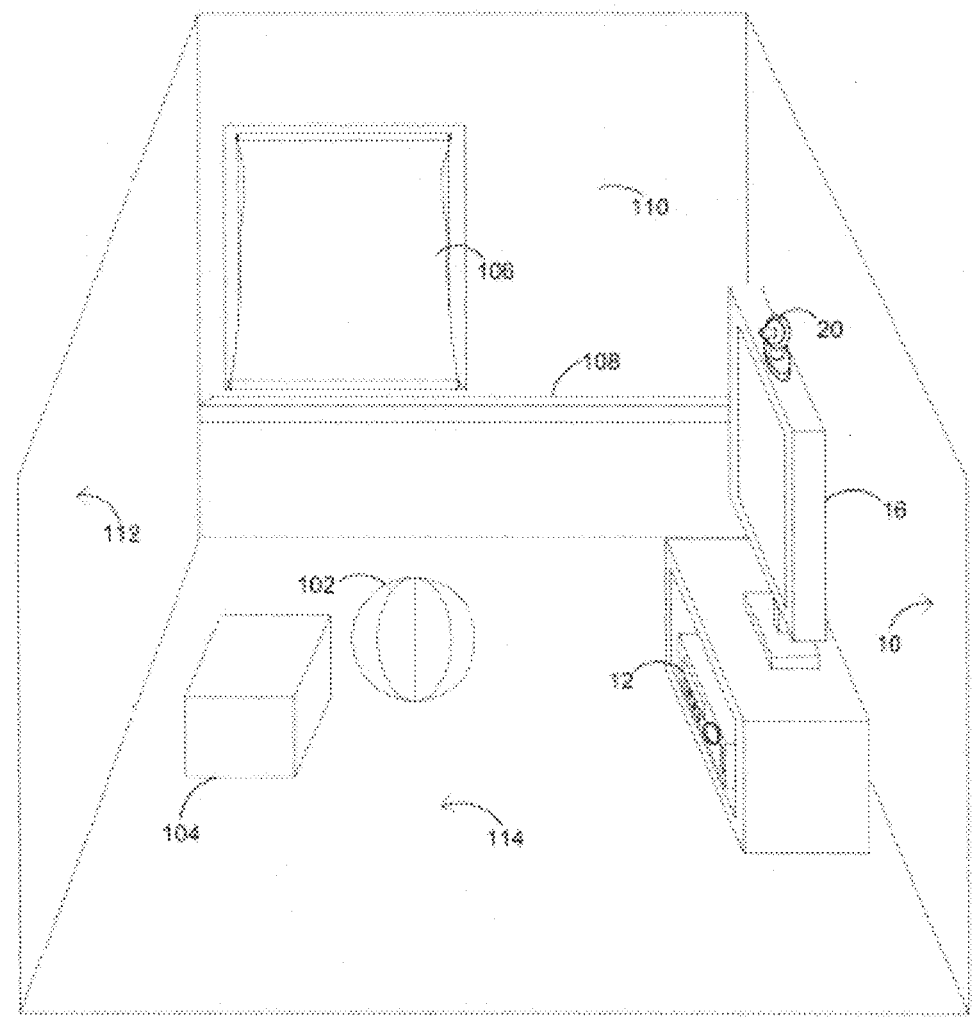
FIG. 1A illustrates an example embodiment of a target digitization, extraction, and tracking system in a physical space having multiple objects.

Disclosed herein are techniques for target digitization that can be used to identify and track objects in a scene and provide real-time feedback to a user. The techniques comprise identifying surfaces, textures, and object dimensions from organized point clouds derived from a capture device, such as a depth sensing device. Employing target digitization may comprise surface extraction, identifying points in a point cloud, computing surfaces, computing object properties, tracking changes in object properties over time, and increasing confidence in the object boundaries and identity as additional frames are captured.

The techniques provide the ability to scan a known/unknown object, scan a human, and scan background aspects in a scene (e.g., floors, walls). The scan data for each, which may include a combination of depth and RGB data, may be used to create a three-dimensional model of the object. The RGB data is applied to the corresponding area of the model. Temporal tracking, from frame to frame, can increase confidence and adapt the object data in real-time. Thus, the object properties and tracking of changes in the object properties over time may be used to reliably track objects that change in position and orientation from frame to frame in real time. The capture device captures data at interactive rates, e.g., at least 20 Hz, increasing the fidelity of the data and allowing the disclosed techniques to process the raw depth data, digitize the objects in the scene, extract the surface and texture of the object, and perform any of these techniques in real-time such that the display can provide a real-time depiction of the scene.

As will be described herein, a user may control an application executing on a computing environment, such as a game console, a computer, or the like, by performing one or more gestures. According to one embodiment, the data representative of a gesture, such as depth image of a scene, may be received by, for example, a capture device. In one embodiment, the capture device or computing system coupled to the capture device may determine whether one or more targets or objects in the scene corresponds to a human target such as the user. To determine whether a target or object in the scene corresponds a human target, each of the targets may be flood filled and compared to a pattern of a human body model. Each target or object that matches the human body model may then be scanned to generate a skeletal model associated therewith. The skeletal model may then be provided to the computing environment for tracking the skeletal model and rendering an avatar associated with the skeletal model.

Captured motion may be any motion in the physical space that is captured by the capture device, such as a camera. The captured motion could include the motion of a target in the physical space, such as a user or an object. The user's motions and/or gestures may be mapped to a visual representation of the user. The motion may be dynamic, such as a running motion, or the motion may be static, such as a user that is posed with little movement. The captured motion may include a gesture that translates to a control in an operating system or application. Thus, a user's motions may be tracked, modeled, and displayed, and the user's gestures recognized from the motion may control certain aspects of an operating system or executing application. Similar principles apply to objects or other non-human targets in the physical space. The system may receive image data and capture motion with respect to any target in the scene and translate the received data for visually representing the target and/or recognizing gestures from the captured motion.

The system, methods, and components of target digitization, extraction, and tracking described herein may be embodied in a multi-media console, such as a gaming console, or in any other computing device in which it is desired to utilize gestures to control aspects of the environment, including, by way of example and without any intended limitation, satellite receivers, set top boxes, arcade games, personal computers (PCs), portable telephones, personal digital assistants (PDAs), and other hand-held devices.

Figure 1B:
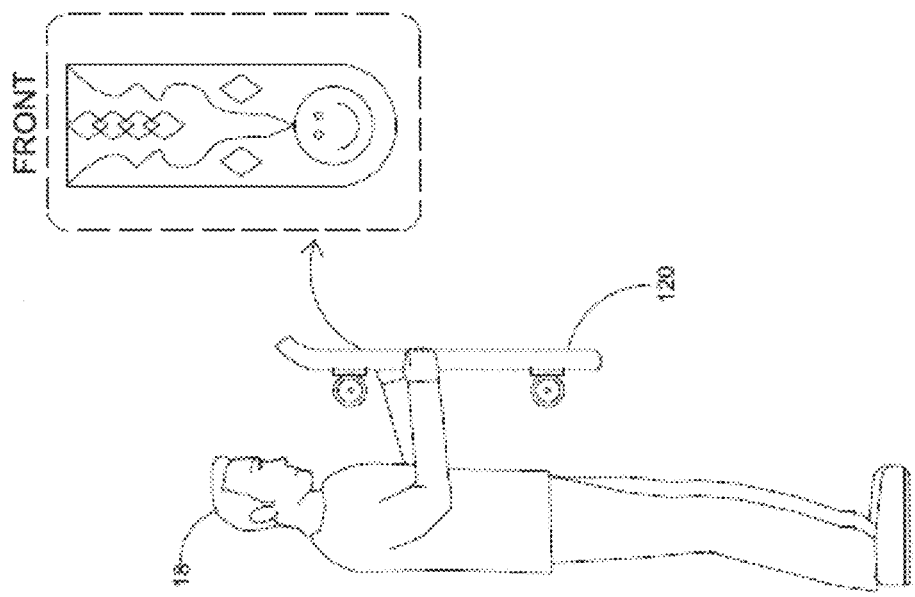
FIG. 1B illustrates an example embodiment of a target digitization, extraction, and tracking system that scans a physical object in the physical space for display.

FIGS. 1A and 1B illustrate an example embodiment of a configuration of a target recognition, analysis, and tracking system 10 that may employ techniques for target digitization, extraction, and tracking. In the example embodiment, a ball 102, box 104, window shade 106, wall rail 108, wall #1 110, wall #2 112, and the floor 114 are various objects in the physical space. In an example embodiment, the system 10 may recognize, analyze, and/or track any of these objects, 102, 104, 106, 108, 110, 112, and 114, as well as other targets, such as a human target such as the user 18 shown in FIG. 1B. The system 10 may gather information related to each of the objects 102, 104, 106, 108, 110, 112, and 114, and/or the user's gestures in the physical space.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

Disclosed herein are techniques for computer vision that pertain to the implementation of target digitization. Computer vision is the concept of understanding the content of scene by creating models of objects in the physical space from captured data, such as depth or color data. As shown in FIG. 1A, the target recognition, analysis, and tracking system 10 may further include a capture device 20. The capture device 20 may be, for example, a camera that may be used to visually monitor objects, such as 102, 104, 106, 108, 110, 112, and 114. As shown in FIG. 1B, the target recognition, analysis, and tracking system 10 may also be used to visually monitor one or more users, such as the user 18, such that gestures performed by the one or more users may be captured, analyzed, and tracked to perform one or more controls or actions within an application, as will be described in more detail below.

Any suitable processing portion in the target recognition, analysis, and tracking system 10 may process raw depth data received by the capture device 20. For example, the techniques may include surface extraction, the interpretation of points in a point cloud based on proximity to recover surfaces, e.g., by identifying surface normals, computation of object properties, tracking the object properties over time, increasing confidence in object identification and shape over time, and scanning a human or known/unknown objects. Each of these is described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to a user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track objects in the physical space or a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application. In another example embodiment, an object, such as the ball 102, may be tracked using the capture device 20 such that movement of the ball 102 may be identified by the capture device. As the object moves, the capture device 20 may identify additional characteristics of the object, identify additional surfaces, and analyze the complete shape of the object 102.

The system 10 may include an RGB capture component, such as within capture device 20, that identifies colors in the scene. For example, the RGB capture component may analyze and identify the colors of the ball 102 and translate the colors to the object that is displayed on the display device 16. The capture of color data and translation of colors to virtual objects displayed that correspond to the physical objects is described in more detail below.

The system 10 may translate an input to a capture device 20 into an animation, the input being representative of an object, a user, an object's motion, or a user's motion, such that the animation is driven by that input. For example, the user's motions may map to an avatar 40 shown in FIG. 1b, such that the user's motions in the physical space are performed by the avatar 40. The user's motions may be gestures that are applicable to a control in an application. As shown in FIGS. 1B, in an example embodiment, the application executing on the computing environment 12 may be a skateboarding game that the user 18 may be playing, where the user's actions translate to controls in the skateboarding game, such as certain skateboarding moves, e.g., jumps, stops, etc.

It may be desirable that the object, and therefore the motion of the object, is entirely virtual. For example, an application involving the display of a fanciful character or object, or very large objects such as a spaceship or a house, may use animations that do not correlate to the objects in the physical space. In the example shown in FIG. 1B, it may not be feasible to have a skateboard ramp set up in the physical space and the skateboard ramp may be virtual only. Thus, the props or objects used in a particular application may be displayed on the screen and the user can interact with the objects by positioning himself properly in the physical space to correspond to a location in the game space. As shown on the display device 16 in FIG. 1B, a skateboard ramp 38 displayed to user 18 is entirely virtual and does not map to any physical objects in the physical space.

Alternately, depending on the scenario, it may be desirable that the virtual object maps to an object in the physical space as described above. The resulting animation of the physical object can be mapped directly to the movement of the object in the physical space, and the animation may therefore more accurately represent the actual movement of the physical object. For example, the user may interact with an actual physical object in the user's physical space that is identified by the capture device and can be displayed in relation to an avatar in the game space.

In another example embodiment, certain characteristics of a physical object may be captured and translated to the virtual object. For example, the movement of the virtual object may be animated or mapped to motion in the physical space, but the appearance of the virtual object may translate to the physical object in either scenario. For example, before performing gestures that control the avatar and the aspects of skateboarding in the skateboarding game, user 18 may hold a skateboard 120 in an area visible to the capture device 20. The capture device 20 may capture size, color, gloss, shine, or any other physical characteristic of the skateboard. Then, whether or not the virtual skateboard 42 maps to the motion of the physical skateboard 120, the virtual skateboard 42 can be given the physical characteristics of the physical skateboard 120. Thus, the user has a feeling that they are using the user's own physical skateboard 120 in the application. As shown in the example, the front of the skateboard is shown in the view 150 for exemplary purposes. As seen on the display device 16, the physical characteristics of the physical skateboard 120, e.g., colors, design, size, shape, are translated to the virtual skateboard 42.

The computing environment 12 may use the audiovisual device 16 to provide a visual representation of a player avatar 40 that the user 18 may control with his or her movements. For example, as shown in FIG. 1B, the user 18 may hold the physical skateboard 120 up and perform a particular motion or hold the object for a specific amount of time that is recognizable by the system 10 as a gesture for requesting a scan of an object. Similarly, the player avatar 40 may have the characteristics of the user identified by the capture device 20. The computing environment 12 may also use the audiovisual device 16 to provide a visual representation of the avatar 40 and the virtual skateboard 42. Thus, according to an example embodiment, the computer environment 12 and the capture device 20 of the target recognition, analysis, and tracking system 10 may be used to recognize and analyze the targets in the physical space and recognize motions of the user 18 that correspond to a game control of the player avatar 40 in game space (e.g., requesting a scan for an object to be used in the application). The motion of the user 18 that is recognized as the 'request for scan' may be defined in a package of gestures applicable to the system, program, computer interface, etc.

In example embodiments, the human target such as the user 18 may hold an object that is scanned. In such embodiments, the user of an electronic game may be holding the object such that the motions of the player and the object may be used to adjust and/or control parameters of the game. For example, the motion of a player holding a racket may be tracked and utilized for generating the appearance of and controlling an on-screen racket in an electronic sports game.

Other movements by the user 18 may also be interpreted as other controls or actions, such as controls to jump, shift, slide, dive. A user's gestures or motion may be interpreted as controls that may correspond to actions other than controlling the player avatar 40. For example, the player may use movements to end, pause, or save a game, select a level, view high scores, communicate with a friend, etc. According to other example embodiments, the target recognition, analysis, and tracking system 10 may interpret target movements for controlling aspects of an operating system and/or application that are outside the realm of games. For example, virtually any controllable aspect of an operating system and/or application may be controlled by movements of the target such as the user 18. The user's gesture may be controls applicable to an operating system, non-gaming aspects of a game, or a non-gaming application.

Similarly, the techniques for target digitization, extraction, and tracking may be applicable to an operating system, non-gaming aspects of a game, or a non-gaming application. For example, a pointing stick may be captured for use in a presentation application, where the capture device may translate physical characteristics of the pointing stick to a virtual pointing stick that maps to the motion of the user's pointing stick. The continuity between the pointing stick visible to users in the physical space and the virtually displayed pointing stick may be pleasing for such applications.

Figure 2:
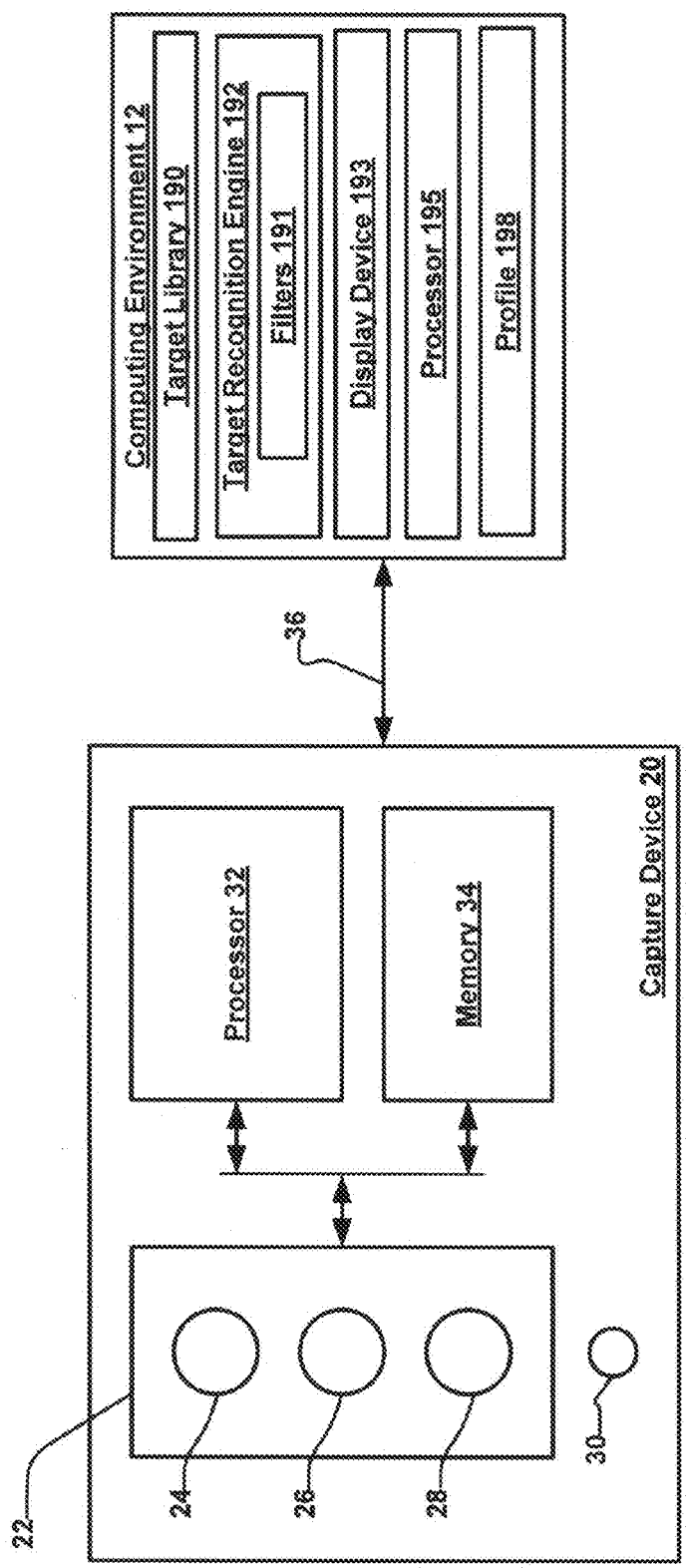
FIG. 2 illustrates an example embodiment of a capture device that may be used in a target digitization, extraction, and tracking system.

FIG. 2 illustrates an example embodiment of a capture device 20 that may be used for target digitization, extraction, and tracking, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor. For example, as shown, in FIG. 2, the computing environment 12 may include a gestures library 190.

As shown, in FIG. 2, the computing environment 12 may include a target library 190 and a target recognition engine 192. The object recognition engine 192 may include a collection of object filters 191. Each filter 191 may comprise information defining an object along with parameters, or metadata, for that object. For instance, a ball typically comprises a sphere. An object filter for the ball may include parameters for a point cloud that correspond to a spherical shape and having surface normals consistent with a spherical surface. Parameters may then be set for that object. Where the object is a captured by the capture device, a parameter may be a threshold number of point data in a point cloud or a threshold number of surface normals detected that correspond to the defined surface normals in the object filter.

The computing environment 12 may include a processor 196 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 20 itself, and the raw image data of depth and color (where the capture device comprises a 3D camera) values are transmitted to the computing environment 12 via link 36. In another embodiment, the processing is performed by a processor 32 coupled to the camera 402 and then the parsed image data is sent to the computing environment 12. In still another embodiment, both the raw image data and the parsed image data are sent to the computing environment 12. The computing environment 12 may receive the parsed image data but it may still receive the raw data for executing the current process or application. For instance, if an image of the scene is transmitted across a computer network to another user, the computing environment 12 may transmit the raw data for processing by another computing environment.

According to an example embodiment, the target may be any object or a human target in any position. The targets may include a human target with an object, two or more human targets, two or more objects, one or more appendages of one or more human targets or the like that may be scanned, tracked, modeled and/or evaluated to generate a virtual screen. The targets that are identified may be compared to one or more stored profiles and/or to store profile information 198 about the scene or a particular target in a computing environment such as computing environment 12. For example, the physical characteristics of the physical skateboard 150 may be stored in a profile that is specific to the virtual skateboard or to the user that selected to scan in the particular skateboard 150. In another example embodiment, the scene of a particular physical space is stored in a profile. For example, objects such as walls, windows, fireplaces, ceiling fans, etc, may be parsed and identified previously for a physical space. By storing this information, it may become easier for the system to distinguish objects in the scene from the existing information. For example, the system may identify more mobile objects that enter the scene without having to separate the object from another object already identified in the scene.

The profile information 198 may be in the form of user profiles, personal profiles, application profiles, system profiles, or any other suitable method for storing data for later access. The profile information 198 may include lookup tables for loading specific user or physical space profile information. A profile may be accessed upon entry of a user into a capture scene or upon turning on the machine for a particular physical space. The profile 198 may be program-specific, or be accessible globally, such as a system-wide profile. A profile 198, such as a user's profile, can be loaded for future use and it can be loaded for use by other users. A profile 198, such as a physical space profile, may be a default for a particular system that may often remain in the same physical location. However, the system may be mobile and thus the user may opt that the system rescans the physical scene. The virtual screen may interact with an application that may be executed by the computing environment 12 described above with respect to FIGS. 1A-1B.

According to example embodiments, lookup tables may include user or physical space specific profile information. In one embodiment, the computing environment such as computing environment 12 may include stored profile data 198 about one or more users in lookup tables. The stored profile data 198 may include, among other things the targets scanned or estimated body size, skeletal models, body models, voice samples or passwords, the targets age, previous gestures, target limitations and standard usage by the target of the system, such as, for example a tendency to sit, left or right handedness, or a tendency to stand very near the capture device. This information may be used to determine if there is a match between a target in a capture scene and one or more user profiles 198, that, in one embodiment, may allow the system to adapt the virtual screen to the user, or to adapt other elements of the computing or gaming experience according to the profile 198.

One or more personal profiles 198 may be stored in computer environment 12 and used in a number of user sessions, or one or more personal profiles may be created for a single session only. Users may have the option of establishing a profile where they may provide information to the system such as a voice or body scan, age, personal preferences, right or left handedness, an avatar, a name or the like. Personal profiles may also be provided for "guests" who do not provide any information to the system beyond stepping into the capture space. A temporary personal profile may be established for one or more guests. At the end of a guest session, the guest personal profile may be stored or deleted.

The target library 190, target recognition engine 192, and profile 198 may be implemented in hardware, software or a combination of both. For example, the target library 190, and target recognition engine 192 may be implemented as software that executes on a processor, such as processor 196, of the computing environment (or on processing unit 101 of FIG. 3 or processing unit 259 of FIG. 4).

It is emphasized that the block diagram depicted in FIGS. 2-4, described below are exemplary and not intended to imply a specific implementation. For example, the processor 195 or 32 in FIG. 1, the processing unit 101 of FIG. 3, and the processing unit 259 of FIG. 4, can be implemented as a single processor or multiple processors. Multiple processors can be distributed or centrally located. For example, the gestures library 190 may be implemented as software that executes on the processor 32 of the capture device or it may be implemented as software that executes on the processor 195 in the computing environment. Any combination of processors that are suitable for performing the techniques disclosed herein are contemplated. Multiple processors can communicate wirelessly, via hard wire, or a combination thereof.

Furthermore, as used herein, a computing environment may include a single computing device or a computing system. The computing environment may include non-computing components. The computing environment may include a display device, such as display device 193 shown in FIG. 2. A display device may be an entity separate but coupled to the computing environment or the display device may be integrated into a computing device that processes and displays, for example. Thus, a computing system, computing device, computing environment, computer, processor, or other computing component may be used interchangeably herein.

Figure 3:
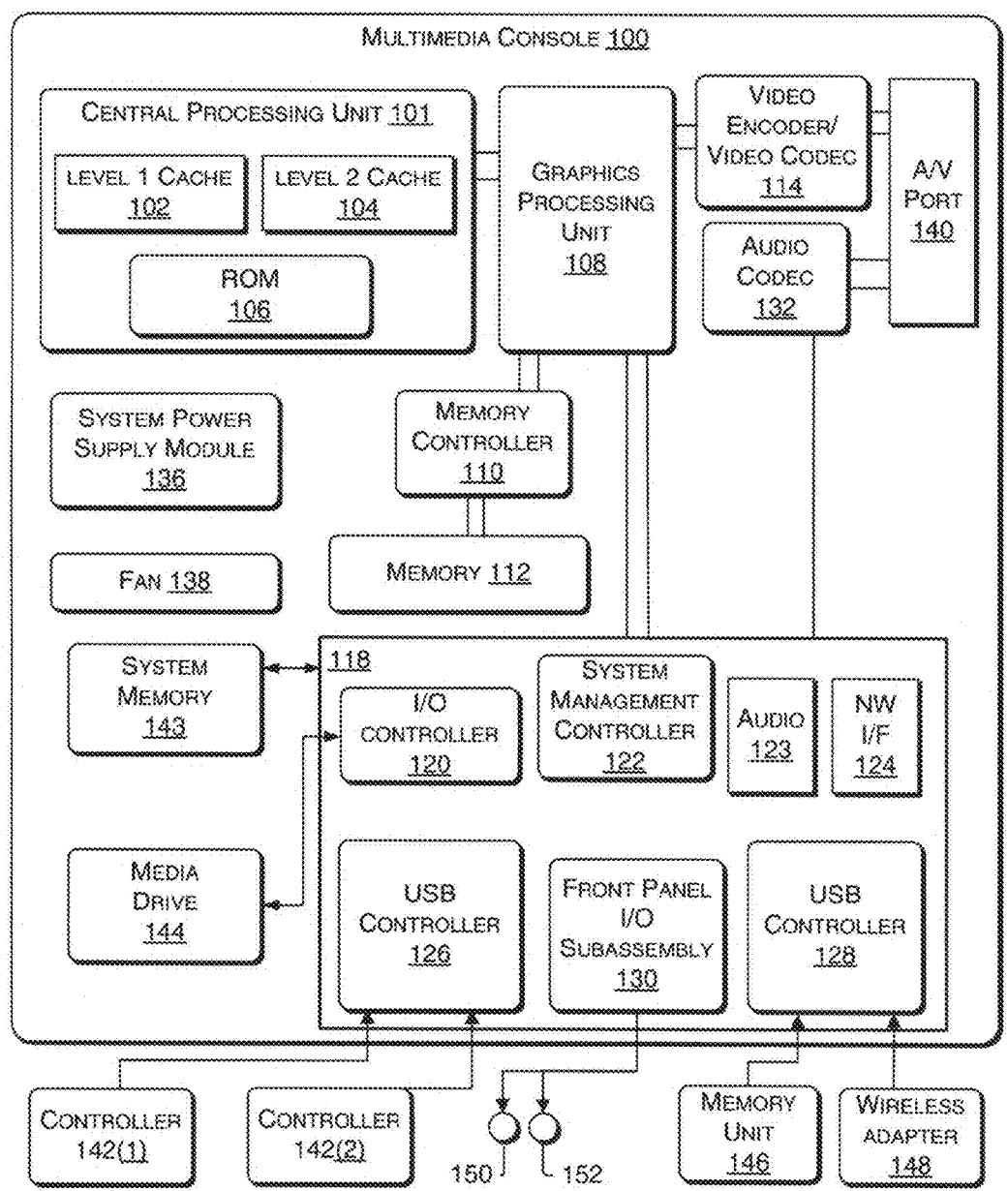
FIG. 3 illustrates an example embodiment of a computing environment in which the target digitization, extraction, and tracking techniques described herein may be embodied.

FIG. 3 illustrates an example embodiment of a computing environment that may be used to interpret one or more gestures in a target recognition, analysis, and tracking system.

The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 1B:
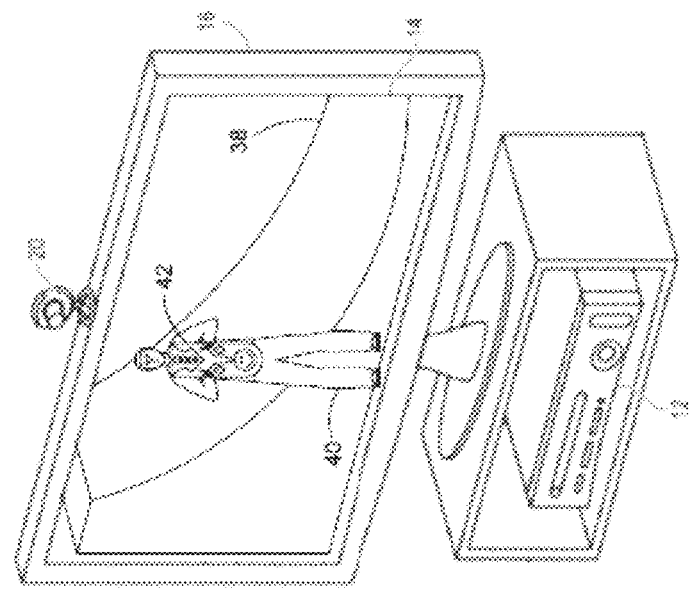
Figure 4:
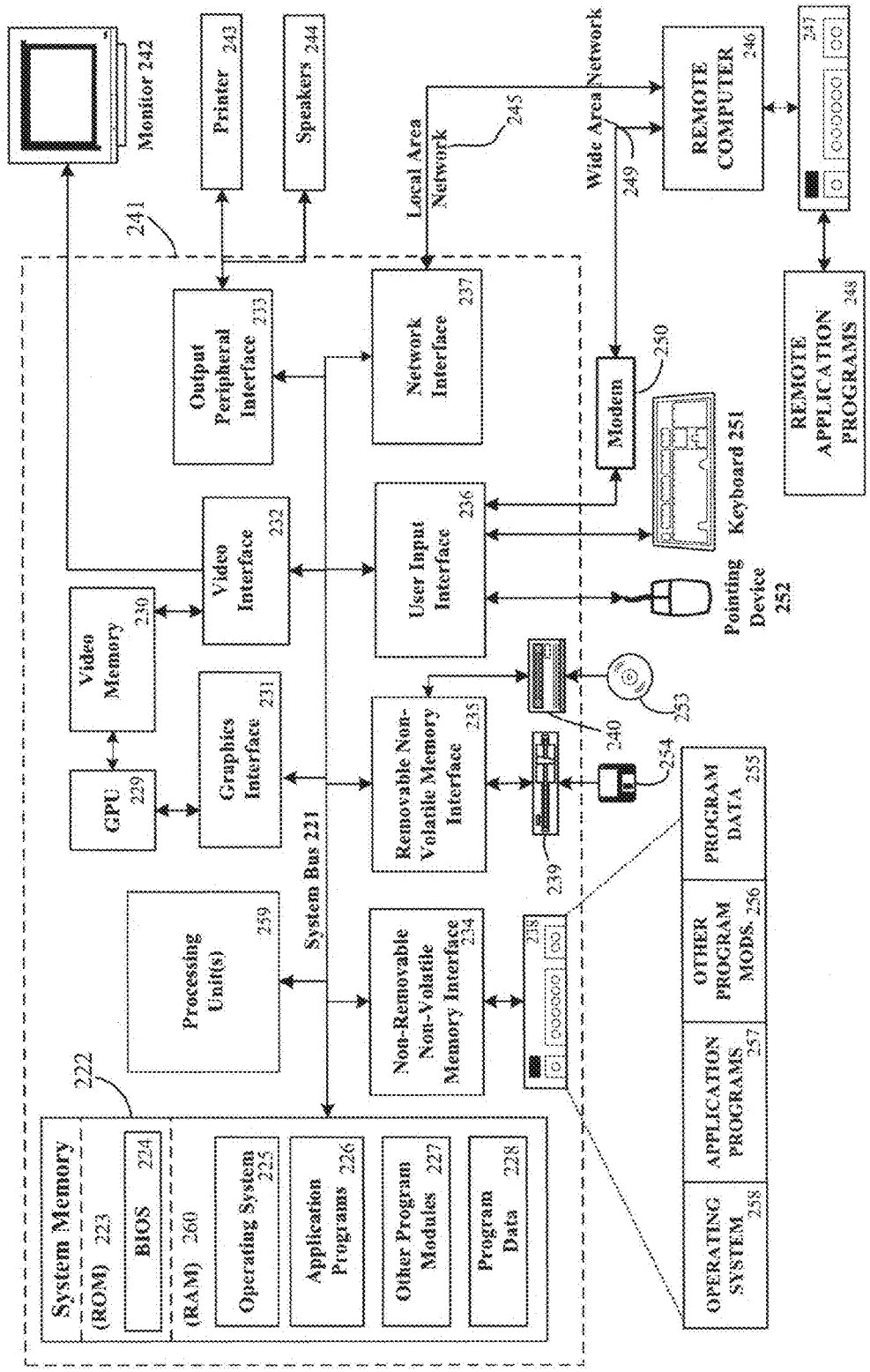
FIG. 4 illustrates another example embodiment of a computing environment in which the target digitization, extraction, and tracking techniques described herein may be embodied.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

The computer readable storage media described above may have stored thereon instructions for remapping a gesture. The computer readable instructions may comprise selecting a gesture filter that corresponds to the gesture for remapping and interpreting data received from a capture device that is representative of a user's motion in a physical space. The instructions may comprise remapping the gesture to the user's motions as interpreted, wherein remapping the gesture may comprise modifying the gesture filter to correspond to the interpreted data.

The computer readable storage media described above may also have stored thereon instructions for remapping a package of complementary gesture filters. The instructions may comprise providing a package comprising a plurality of filters, each filter comprising information about a gesture, at least one filter being complementary with at least one other filter in the package. The instructions may comprise remapping a first value to a parameter of a first filter to correspond to data received from a capture device that is representative of a user's motion in a physical space and, as a result, remapping a second value to a second parameter of a second filter, the second value determined using the first value.

Figure 5:
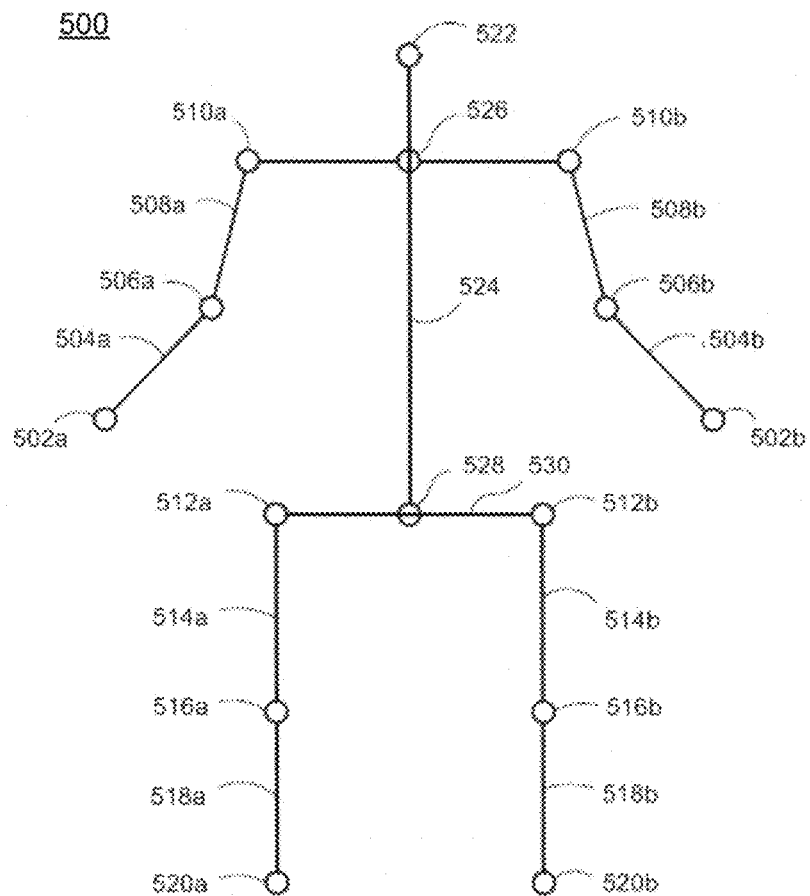
FIG. 5 illustrates a skeletal mapping of a user that has been generated from a depth image.

FIG. 5 depicts an example skeletal mapping of a user that may be generated from image data captured by the capture device 20. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 20. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and braking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least .95. Where an application must recognize every instance of the gesture, even at the cost of false-positives, it may use gestures that have at least a much lower confidence level, such as those merely greater than .2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510*a*, and on the same side of the head 522 as the throwing arm 502*a*-310*a*. It may not be necessary to define all bounds of a volume, such as with this throwing gesture, where an outer bound away from the body is left undefined, and the volume extends out indefinitely, or to the edge of scene that is being monitored.

Figure 6:
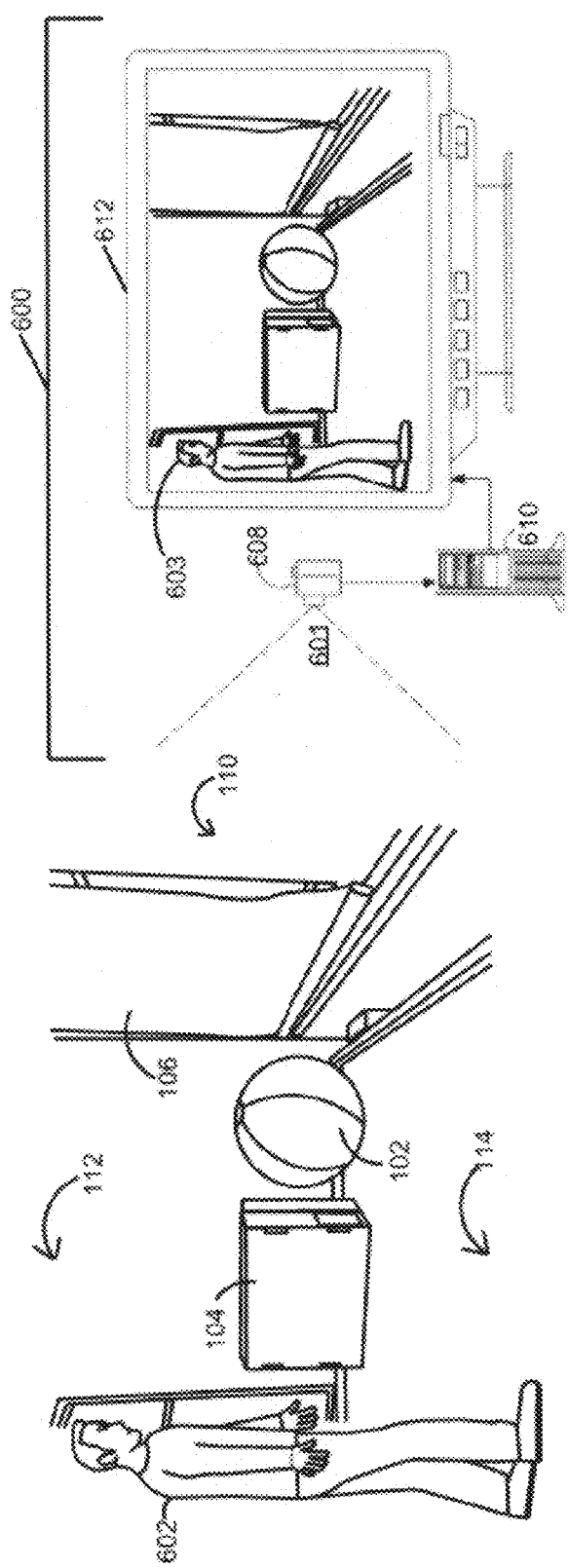
FIG. 6 depicts an example target digitization, extraction, and tracking system and an example display of the physical space, also shown in FIG. 1A.

FIG. 6 illustrates an example of a system 600 that can capture targets in a physical space 601 and map captured data to a visual representation in a virtual environment. As shown in FIG. 6, system 600 may comprise a capture device 608, a computing device 610, and a display device 612. For example, the capture device 608, computing device 610, and display device 612 may comprise any suitable device that performs the desired functionality, such as the devices described with respect to FIGS. 1A-5. It is contemplated that a single device may perform all of the functions in system 600, or any combination of suitable devices may perform the desired functions. For example, the computing device 610 may provide the functionality described with respect to the computing environment 12 shown in FIG. 2 or the computer in FIG. 3. The computing device 610 may also comprise its own camera component or may be coupled to a device having a camera component, such as capture device 608.

In this example, the physical scene includes the ball 102, box 104, window shade 106, wall rail 108, wall #1 110, wall #2 112, and the floor 114 that are shown in the physical space depicted in FIG. 1A. Further shown in the scene is a user 602. In an example embodiment, the system 10 may recognize, analyze, and/or track any of these objects, 102, 104, 106, 108, 110, 112, and 114, as well as other targets, such as a human target such as the user 602. The system 10 may gather information related to each of the objects 102, 104, 106, 108, 110, 112, and 114, and/or the user's 602 gestures in the physical space. A user in the physical space, such as user 602 may also enter the physical space. The user's 602 motions are mapped to the avatar 603 and may also correspond to gestures that control aspects of the game. Thus, the user 602 performs motions in the physical space 601 that translate to certain controls in the virtual space.

The virtual space may comprise a representation of a three-dimensional space that a user 602 may affect—say by moving an object—through user input. The virtual space may include a representation of a virtual object that corresponds to a physical object in the physical space 601. The depth camera may capture and scan a physical object and display a virtual object that maps directly to the image data of the physical object scanned by the depth camera. This may be a physical object in the possession of the user. For instance, if the user has a chair, that physical chair may be captured by a depth camera and a representation of the chair may be inserted into the virtual environment. Where the user moves the physical chair, the depth camera may capture this, and display a corresponding movement of the virtual chair.

The target may be any object or user in the physical space 601. For example, the capture device 608 may scan a human 602 or a non-human object, such as a ball 607, a cardboard box 609, or a dog 605, in the physical space 601. In this example, the system 600 may capture a target by scanning the physical space 601 using a capture device 608. For example, a depth camera 608 may receive raw depth data. The system 600 may process the raw depth data, interpret the depth data as point cloud data, convert the point cloud data to surface normals. For example, a depth buffer may be captured and converted into a ordered point cloud.

A depth buffer may be a buffer that records the depth of each pixel that is rendered. The depth buffer may keep record of additional pixels as they are rendered and determine the relationships between the depths of different pixels that are rendered. For example, the depth buffer may perform hidden surface removal and compare each pixel that is to be rendered with the pixel already in the frame buffer at that position. Also called a z-buffer, the depth buffer may compose a frame buffer that stores a measure of the distance from the capture device to each visible point in a captured image.

Based on the point clouds and surface normals identified, the system 600 may label objects parsed in the scene, clean up noise, and compute an orientation for each of the objects. A bounding box may be formed around an object. The object may then be tracked from frame-to-frame for texture extraction.

According to one embodiment, image data may include a depth image or an image from a depth camera and/or RGB camera, or an image on any other detector. For example, camera 608 may process the image data and use it to determine the shape, colors, and size of a target. In this example, the targets 602, 102, 104, 106, 108, 110, 112, and 114, in the physical space 601 are captured by a depth camera 608 that processes the depth information and/or provides the depth information to a computer, such as a computer 610.

The depth information may be interpreted for display of a visual representation on display 612. Each target or object that matches the human pattern may be scanned to generate a model such as a skeletal model, a mesh human model, or the like associated therewith. Each target or object that matches a library of known objects may be scanned to generate a model that is available for that particular object. Unknown objects may also be scanned to generate a model that corresponds to the point cloud data, RGB data, surface normals, orientation, bounding box, and any other processing of the raw depth data that corresponds to the unknown object.

FIG. 6 represents the physical space 601 at a discrete point in time and the display 612 displays a visual representation 606 that corresponds, at that point in time, to the physical space 601, including the targets scanned, human 602, ball 607, box 609, and dog 605. Though additional frames of image data may be captured and displayed, the frame depicted in FIG. 6 is selected for exemplary purposes. The rate that frames of image data are captured and displayed determines the level of continuity of the display of the visual representation, as the targets may move in the physical space. Further, over time, the number of frame-to-frame images may increase the confidence of the way in which the point cloud data is parsed into separately labeled objects. Movement of an object may give further depth information regarding the surface normals and orientation. The system 600 may be able to further distinguish noise from desired point data. The system 600 may also identify a gesture from the user's 602 motion by evaluating the user's 602 position in a single frame of capture data or over a series of frames.

The system 600 may track any of the targets 602, 102, 104, 106, 108, 110, 112, and 114 in the physical space 601 such that the visual representation on display 612 maps to the targets 602, 102, 104, 106, 108, 110, 112, and 114 and motions of any of those targets captured in the physical space 601. The object in the physical space may have characteristics that the capture device can capture and scan to display a virtual object. The physical object may have characteristics that are translated to the displayed virtual object. For example, the user may be holding a skateboard. The system may scan the skateboard or the skateboard may be tagged in the physical space where the system can detect the object based on the tag. The physical object may correspond to the displayed virtual object such that interaction with the physical object translates to certain movement in the virtual space with respect to the virtual object, such as the virtual skateboard ramp shown in FIG. 1B.

Figure 7A:
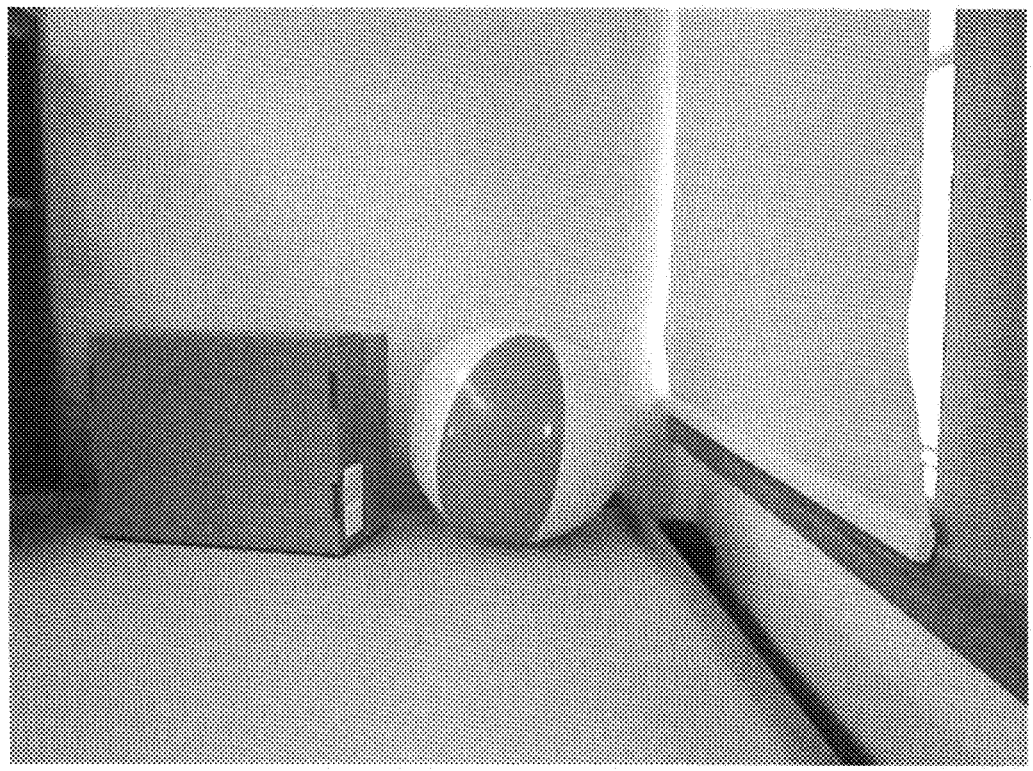
FIGS. 7A-7C depict example iterations of the processing of a physical space for target digitization, extraction, and tracking
Figure 7B:
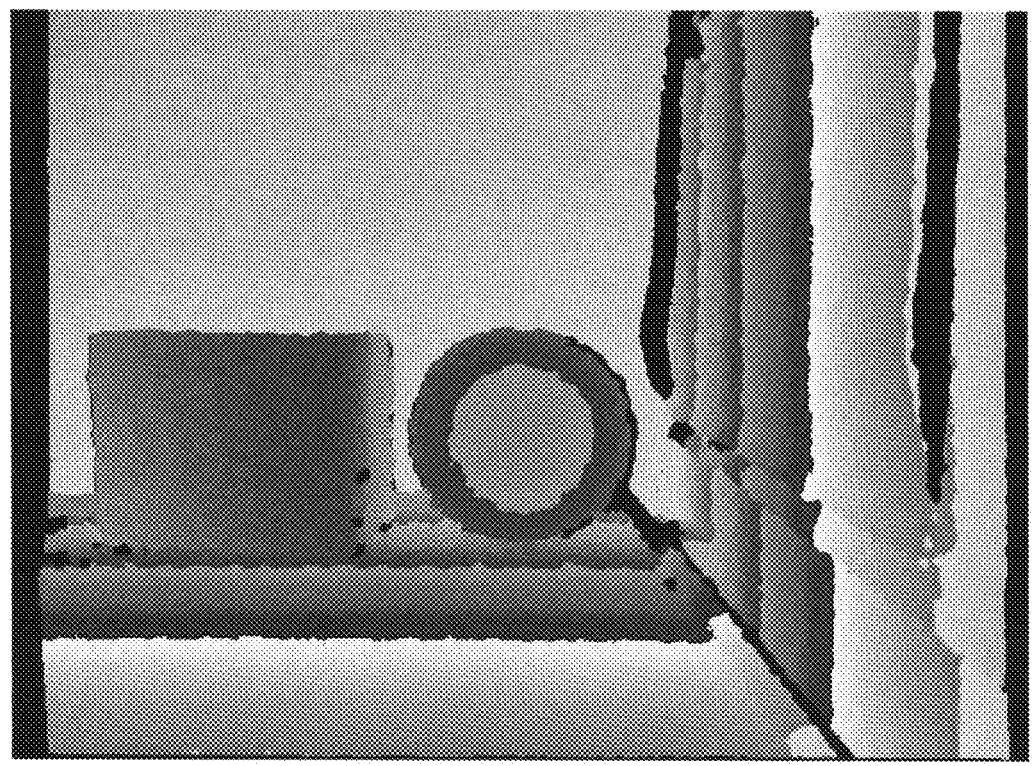
Figure 7C:
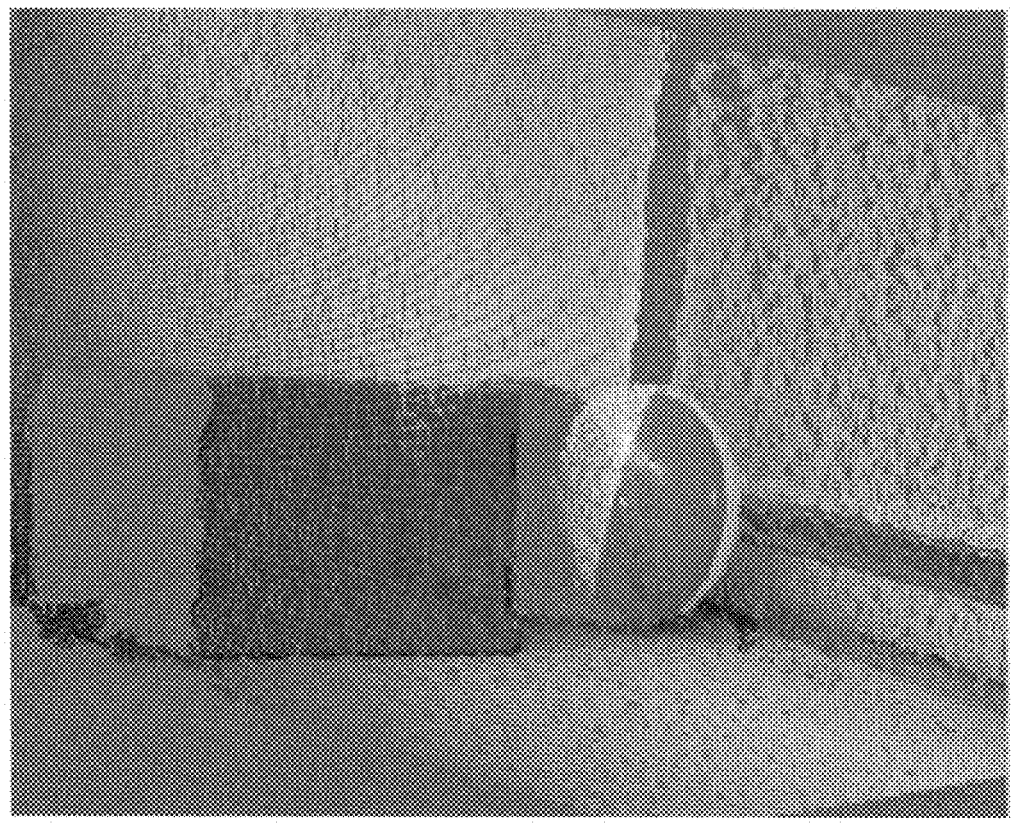

Disclosed herein are techniques for computer vision that pertain to the implementation of target digitization. FIGS. 7A-7C depict examples of the iterations of processing that may be performed on the raw depth data received with respect to a scene and the objects in that scene. Computer vision is the concept of understanding the content of scene by creating models of objects in the physical space from captured data, such as raw depth or image data. For example, the techniques may include surface extraction, the interpretation of points in a point cloud based on proximity to recover surface normal, computation of object properties, tracking the object properties over time, increasing confidence in object identification and shape over time, and scanning a human or known/unknown objects.

The capture device may scan a physical space and receive range data regarding various objects in the physical space 601. The scan may include a scan of the surface of an object or a scan of the entire solid. By taking the raw depth data in the form of a two-dimensional depth buffer, any suitable computing device may interpret a large number of points on the surface of an object and output a point cloud. A point cloud may be a set of data points defined in a three-dimensional coordinate system, such as data points defined by x, y, and z coordinates. The point cloud data may represent the visible surfaces of objects in the physical space that have been scanned. Thus, an object may be digitized by representing objects in the scene as a discrete set of points. The point cloud data may be saved in a data file as two-dimensional data set.

The range data may be captured in real time using a capture device such as a depth camera or a depth sensing device. For example, frames of data may be captured at a frequency of at least 20 hertz using a depth sensing camera in the form of a depth buffer. The data may be interpreted into a structured cloud of sample points, where each point may comprise characteristics of the associated target, such as location, orientation, surface normal, color or texture properties. The point cloud data can be stored in a two-dimensional data set. As the optical properties of the capture device are known, the range data can be projected into a full three-dimensional point cloud, which can thereby be stored in a regularized data structure. The three-dimensional point cloud may indicate the topology of the object's surface. For example, the relations between adjacent parts of the surface may be determined from the neighboring points in the cloud. The point cloud data can be converted into a surface, and the surface of the object represented by the point cloud data may be extracted by evaluating the surface normals over the surface of the point cloud data. The regularized data structure may be analogous to a two-dimensional depth buffer.

FIG. 7A shows an RGB image feed of an example physical scene that is the subject of the target digitization, extraction, and tracking that is disclosed herein. FIG. 7B shows a false color depth data feed. FIG. 7C depicts both the color and depth feeds merged and projected into a point cloud.

A point cloud, such as that shown in FIG. 7C, may comprise a number of data points related to various objects in a physical space. The point cloud data may be received or observed by a capture device, such as that described herein. The point cloud may then be analyzed to determine whether the point cloud includes an object or a set of objects. If the data includes an object, a model of the object may be generated. An increase in confidence in the object identification may occur as frames are captured. Feedback of the model associated with a particular object may be generated and provided real time to the user. Further, the model of the object may be tracked in response to any movement of the object in the physical space such that the model may be adjusted to mimic the movement of the object.

All of this can be done at a rate for processing and a real-time display of the results. A real-time display refers to the display of a visual representation of a gesture or display of visual assistance, wherein the display is simultaneously or almost simultaneously displayed with the performance of the gesture in the physical space. For example, an update rate of the display at which the system may provide a display that echoes a user and the user's environment may be at a rate of 20 Hz or higher, wherein insignificant processing delays result in minimal delay of the display or are not visible at all to the user. Thus, real-time includes any insignificant delays pertaining to the timeliness of data which has been delayed by the time required for automatic data processing.

The capture device captures data at interactive rates, increasing the fidelity of the data and allowing the disclosed techniques to process the raw depth data, digitize the objects in the scene, extract the surface and texture of the object, and perform any of these techniques in real-time such that the display can provide a real-time depiction of the scene. In order to cluster groups of points in the cloud into discrete objects in the scene for any given frame, the depth buffer may be walked in scan lines left to right and then top to bottom. Each corresponding point or cluster of points in the cloud may be processed at the time of scan.

The camera may capture depth and color data and assign color to the point clouds that correspond to the color data. Thus, the camera may interpret the depth data to represent the physical space in three-dimensional as the capture device views it from the camera's point of view. The three-dimensional point cloud data can be fused and joined such that the points become a point cloud, and a subset of points in the cloud may be labeled as a particular object. From this labeled point cloud, three-dimensional data can be recovered for each labeled object and a corresponding mesh model created. Because the color information is correlated to the depth information, texture and surface for an object can also be extracted. Such target digitization may be useful for gaming applications or non-gaming applications, such as operating systems or software applications. Providing feedback on a display device that is in real-time with respect to the capture and processing of the depth data provides for a rewarding interactive experience, such as playing a game.

In the example depicted in FIGS. 7A-7C, the walls, ceilings, and floor are in the physical space. From the analysis of point cloud data resulting from processing the raw depth data received by a capture device, such as the point cloud data represented in FIG. 7B, the system may label the walls and floors. Then, additional information about the physical scene may be extracted, such as the shape of the room.

The information in the depth buffer may be used to separate surfaces from the objects identified from the raw depth data. The first pass walk by the depth buffer may be used to compute a normal map for the depth buffer based on surface normal's derived from the point cloud. Thus, rather than individual points in space, the system may derive the direction to which the surface points. The system may recover surface normals from the depth buffer and store the surface normals with the points in the cloud to which the surface normals are associated. The surface normals may be used to identify shapes and contours of an object. For example, a sphere may have a gradual constant change in the direction of normals over the entire surface. The surface normals for various objects may differ in various object filters for comparing to the surface normals detected in a scene.

Although a computation of surface normals and normal map computations are common techniques disclosed herein for identifying a surface from the point cloud data, any suitable surface separating or extraction technique may be used, such as Hough Transforms, normal mapping, Fourier transforms, Curvelet transforms, etc. For example, the computation for separating and/or extracting surfaces from a point cloud could be accomplished using a Hough Transform for planar surfaces. A normal map would not be necessary in such instance, rather a Hough Transform of the point cloud could be produced. Thus, when points of the cloud are fused into objects and labeled, an evaluation of the Hough space for each point may indicate if a point lays on a plane with neighboring points, enabling the system to separately label specific planar surfaces constituent to a particular object. Any suitable separation/extraction technique may be used, and may be tuned to the overall labeling performance and characteristics dependent upon the scenario. While using various surface separation/extraction techniques may change the labeling heuristics, any suitable technique may be used for such identification and labeling and still enable the system to process the depth data in real time for generating and refreshing the display in real time to the user.

Noise may result from the type of depth sensor used. The first walk phase may include a noise suppression pass on the raw data. For example, a smoothing pass may be performed to remove noise from the normal map.

A user, such as the user 18 shown in FIG. 1B, may bring an object into the physical space and hold up the object to the capture device. Because we can analyze, scan, and recognize the human as described above, the capture device can identify where the user's hands are and that they are holding something. From a three-dimensional representation of the object, the system can determine the orientation of the object, snap the texture of the object, and then translate that into the virtual scene. For example, a user may bring a football into a physical space. The capture device may capture image data of the football, identify that the surface is round with an oblong shape. The system may generate the ball with the captured dimensions and textures. The system may compare the depth information to a target library to determine if any of the filters comprise information related to the depth data. The system may identify the object as a football and add characteristics and analyze the object for specific characteristics that are typical for a football. Alternately, the system may not identify the object as a specific object, but may still generate the ball with the captured dimensions and textures. The system may prompt the user to rotate the object to gather information of the object from different perspectives and angles. For example, if the object the user were holding is a doll with an asymmetrical shape, upon rotation, the system may identify additional characteristics of the doll and translate those characteristics to the virtually displayed doll. The system may initially identify an object as a football, but upon rotation recognize that the object is actually a toy with accessories not visible from the initial view captured by the capture device.

The points in a cloud may be labeled in a two-dimensional scan pass over the data set, where options that are close together and have similar surfaces identified may be labeled as belonging to the same object. For example, if the surface separating technique involves the generation of a normal map, data sets that are closet together and have similar surface normals may be labeled as belonging to the same object. The labeling provides a distinction between planar and gently curving surfaces while spatially joined or disjoint surfaces like floors and walls may be labeled separately. The points in connectivity with neighboring points may be labeled based on the distance between those points and the corresponding surface normals which point in a similar direction. Tuning the distance threshold and normal similarity threshold results in different size and curvature of objects and surfaces being discretely labeled. The threshold and expected results for known objects may be stored in the object filters.

As shown in FIG. 7C, the point clouds for the ball 102 and box 104 are shown. The evaluation of the point cloud data in proximity and the surface normals identified from the collection of point clouds may distinguish the ball from the box. Thus, each object, 102 and 104, can be labeled. The labeling may simply be a unique identification. The combination of position of points in the cloud and surface normals is useful to differentiate between objects on a surface or objects that make up the object. For example, if a cup was sitting on top of box 104, the cup may be labeled with the same unique ID given to the box, as it may not yet be determined from the point cloud data that the objects are disjointed. However, by then accounting for surface normals, the system can determine that there is a ninety degree difference between the surface normals and determine that the objects should be labeled separately based on the proximity of points and point clouds. Thus, groups of data points in the point cloud that are consistent with structural surface elements may be associated and labeled.

The system can re-project the determined surface orientations of various point clouds and realign the texture as if it were on a planar surface. The technique enables the system to retexture the object more accurately. For example, if a user holds up a magazine with printed text, there is no limit to the orientation by which the user can hold up the magazine to the capture device. The capture device can re-project the captured texture of the magazine surface and re-project that texture, including the color information, text, and any texture.

An object that is labeled and has a set of parameters computed for which it encompasses, the system may perform or continue to perform analysis for purposes of increased fidelity, organization, and structure to the virtual scene. For example, a best fit bounding box may be a more accurate way to distinguish a particular object. The best fit bounding box may give orientation of the object in a particular frame. For example, the box with a coffee cup on top may initially be given a bounding box that includes both the point cloud of the box and the point cloud representing the coffee cup. In each frame, the system can evaluate that objects that are spatially in the same location as in the last frame and determine if the orientation is similar. The coffee cup may move from frame to frame and the system may identify that the cup is separate from the box and therefore generate a new bounding box for the cup and redefine the bounding box for the cardboard box.

Sometimes noise is introduced into the system due to insignificant particles or objects in the room, or based on the type of sensor used. For example, a set of points in a cloud may represent that of a fly, or the type of sensor used may result in extraneous points that are superfluous. To reduce noise, a cleaning phase may be performed to clean the sensor data or remove very small objects and objects that only have a small number of constituent point samples. For example, a dust particle or a fly in a scene may be captured, but the small number of constituent point samples representing the fly may not be significant enough to trigger the identity of surface normals associated with that point cloud. Thus, the small number of constituent point samples representing the fly may be extracted from the analysis. An initial pass of the point cloud data may use points together in objects that are spatially related to give a large array of objects. For example, a large collection of points may be a couch and labeled with a particular ID; another object may be the floor. A certain threshold may be set to identify the set of points that should be removed from the analysis. For example, if only 20 points are identified for an object and the spatial arrangement of the 20 points is in a relatively small area compared to the physical space or other objects in the scene, then the system may eliminate those 20 points.

An axis aligned bounding box may be used as a quick measure of total volume/space taken up by the object. Axis aligned refers to the special axis such as X, Y or Z and not the axis of the object in space. For example, the system may compute whether the surface is complex or simple (e.g. sphere or magazine has a simple surface; a doll or plant has a complex surface). Rotation of the object may be useful for the system to analyze and determine more refined characteristics of the object. The capture device may perform a solid scan of an object for volume estimation. The capture device may also provide references between point clouds and objects in the scene, such that a particular location for an object in reference to the physical space can be identified.

The computation of object properties and the tracking of these changes over time established a reliable technique for tracking objects that may change in position and orientation from frame to frame in real time. The use of temporal information to capture the changes may give further confidence to the parsing, identification, and labeling of objects in the scene as more frames are captured. Due to the size of a typical data set, such as 640×480 points, even complex processing can be achieved using the disclosed techniques. Data can be captured in frame sequences at a frequency of at least 20 Hertz.

Object parameters may be compared with those of a previous frame, and objects may-be re-labeled to allow moving objects to be tracked in real-time while also maintaining continuous labeling from static objects. A confidence may be computed for each object, and the confidence factor may increase over time. Thus, static objects may move in and out of view due to occlusion while confidence in the object may remain high. The temporal analysis may comprise an evaluation of the last frame and the present frame. If the object is the same in each frame, then the object may be relabeled with the label it had in the previous frame to give coherence to labels and objects from frame to frame. Object and surface orientation and location may be used to estimate orientation of the depth camera as well as gather statistical data relating to the camera surroundings. For example, locations of major planar surfaces which in many cases will equate to walls and floors.

Figure 8:
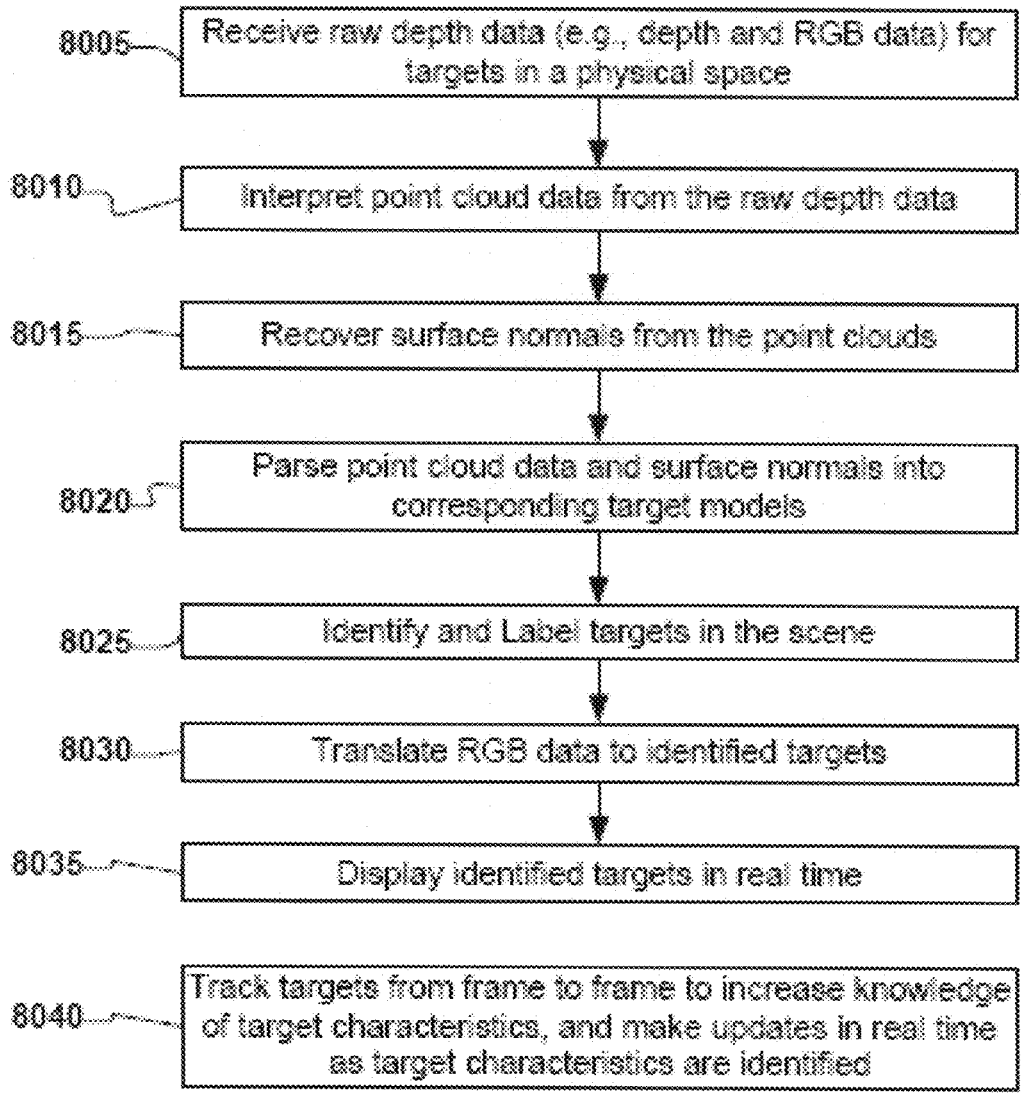
FIG. 8 depicts an example flow diagram for a method for target digitization, extraction, and tracking.

FIG. 8 depicts an example flow of target digitization, extraction, and tracking. At 8005, a system, such as the target recognition, analysis, and tracking system 10 described with respect to FIGS. 1A-B may receive raw depth data for target or a target's motion in a physical space.

The example method may be implemented using, for example, the capture device 20 and/or the computing environment 12 of the target recognition, analysis, and tracking system 10 and techniques described above. According to an example embodiment, the target may be an object, a human target, a human target with an object, two or more human targets, or the like that may be scanned to generate a model such as a point cloud model, a skeletal model, a mesh human model, or any other suitable representation thereof. The model may then be used to interact with an application that may be executed by the computing environment 12 described above with respect to FIGS. 1A-1B. According to an example embodiment, the target may be scanned to generate the model when an application may be started or launched on, for example, the computing environment 12 and/or periodically during execution of the application on, for example, the computing environment 12. A capture device, such as captured device 20, may receive image data about a scene, the image data may be parsed and interpreted to identify a target in the scene. A series of images may be interpreted to identify motion of the target.

At 8010, the system may interpret point cloud data from the raw depth data and, at 8015, recover surface normals from the point clouds.

The system may, using the surface normal information, parse the point cloud data at 8020 into corresponding targets and generate target models based on the parsing. The targets may be identified and labeled based on the parsed point cloud data at 8025.

At 8030, the system may apply the RGB data received at 8005 to the identified targets. For example, a particular set of point cloud points may be identified as a ball because the surface normals indicate a spherical object. The system may translate the RGB data, such as stripes on the ball that are associated with the point cloud data, to the target model. Thus, the identified targets are given the RGB data captured by the system.

At 8035, the system may display the identified targets in real time. Thus, the processing in the preceding steps may be performed in real time such that the display corresponds to the physical space in real time. In this manner, an object, a user, or motion in the physical space may be translated for display at 8035, real time, such that the user may interact with an executing application in real time. For example, in a game application, a user can perform motions in the physical space or move objects in the physical space and see the results real time on the display. In another example, the system can scan known and unknown objects from the physical space and translate the surface, texture, dimensions, etc data for a lifelike display of the objects.

At 8040, the system may continue tracking the targets in the physical space. From frame to frame, the system can compare the raw depth data to identify changes between frames. Updates to the targets parsed, identified, and labeled may result from the comparison. For example, an object may be identified based on the point cloud data as a single object. As frames are compared and as time passes, it may become clear that the single object is actually two or more objects. For example, a game stick may have a net with a ball in the net. Over time, a user may move the game stick and or remove the ball from the net. The system may identify the movements and distinguish the disjointed point cloud data between the ball and the game stick. The system may make updates, in real time, to the target characteristics as they are identified.

Although the above examples are described with respect to gaming applications, the same principles may apply in the non-gaming context. Any systems that use gestures for control, such as a computing system that uses gestures to navigate through the computer interface, or an entertainment system that uses gestures to select a movie to watch, the standard gesture that defines the control may not be one that a user can perform. However, it should be understood that the target recognition, analysis, and tracking system 10 may interpret target movements for controlling aspects of an operating system and/or application that are outside the realm of games. For example, virtually any controllable aspect of an operating system and/or application may be controlled by movements of the target such as the user 18.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the par In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method of target extraction from a physical space, the method comprising:
    receiving depth data representative of the physical space;
    converting the depth data into a point cloud and extracting at least one surface from the point cloud;
    identifying a target in the physical space from the at least one surface;
    generating a model of the target with respect to the receipt of the depth data;
    labeling the target with a unique ID in accordance with a tunable distance threshold and a tunable normal similarity threshold;
    identifying color and/or texture associated with the at least one surface based on the extraction of the at least one surface and the point cloud; and
    displaying a visual representation of the model including painting the color and/or texture onto the visual representation of the model.

2. The method of claim 1, wherein extracting the at least one surface comprises at least one of computing a surface from the depth data via at least one of a Hough transform, a Fourier transform, a computation of surface normals, or a Curvelet transform.

3. The method of claim 1, further comprising comparing the depth data to a target filter for target recognition, and if the comparison indicates an association of the point cloud with the target filter, labeling the target to associate with the target filter.

4. The method of claim 1, further comprising:
    tracking the target in the physical space by evaluating the depth data received that is representative of the target;
    comparing the depth data from frame-to-frame to identify temporal information for updating the point cloud; and
    updating the model of the target based on the temporal information,
    wherein the temporal information comprises differences in the depth data between frames and a second surface extracted from the updated point cloud.

5. The method of claim 4, further comprising using the temporal information to determine a confidence rating for the identified target in the physical space.

6. The method of claim 4, wherein an update rate for updating the model of the target is at least 20 Hz.

7. The method of claim 1, further comprising setting a threshold number for points in a set of associated points that indicates noise, and if the points in the set of associated points is below the threshold number, removing the points.

8. The method of claim 1, further comprising computing a bounding box associated with each identified target and determining at least one of orientation or axis of rotation from the bounding box.

9. The method of claim 1, wherein the target is at least one of a known object, an unknown object, or a human user.

10. A method of texture extraction, the method comprising:
    scanning a target in a physical space;
    identifying a point cloud associated with the target;
    labeling the target with a unique ID in accordance with a tunable distance threshold and a tunable normal similarity threshold;
    capturing target characteristics comprising color and/or texture from the scan based on an extraction of at least one surface from the point cloud; and
    displaying a visual representation of the target in a virtual space including translating the target characteristics from the scan to the visual representation of the target, the translating comprising painting the color and/or texture onto the visual representation of the target.

11. The method of claim 10, wherein the target characteristics from the scan further comprise dimensions of the target.

12. The method of claim 10, wherein a user identifies the target to be scanned.

13. The method of claim 10, further comprising updating the visual representation of the target based on a second scan of the target in the physical space.

14. The method of claim 13, wherein an update rate for updating the visual representation of the target is at least 20 Hz.

15. The method of claim 10, wherein a user performs a gesture to identify the target to be scanned.

16. The method of claim 10, further comprising comparing the point cloud associated with the target to at least one target filter for target recognition to determine if the target is a known target or an unknown target.

17. The method of claim 16, wherein if the target is a known target, applying features of the known target to the visual representation of the target.

18. A device for extracting a target in a physical space, the device comprising:
a camera component, wherein the camera component receives depth data representative of the target in the physical space; and
a processor, wherein the processor executes computer executable instructions, and wherein the computer executable instructions comprise instructions for:
converting the depth data into a point cloud and extracting at least one surface from the point cloud;
identifying the target in the physical space from the at least one surface;
generating a model of the target with respect to the receipt of the depth data;
labeling the target with a unique ID in accordance with a tunable distance threshold and a tunable normal similarity threshold;
identifying color and/or texture associated with the at least one surface based on the extraction of the at least one surface and the point cloud; and
displaying a visual representation of the model including painting the color and/or texture onto the visual representation of the model.

19. The device of claim 18, wherein extracting the at least one surface comprises at least one of computing a surface from the depth data via at least one of a Hough transform, a Fourier transform, a computation of surface normals, or a Curvelet transform.

20. The device of claim 18, further comprising a display component for displaying the visual representation of the model with respect to the receipt of the depth data.

21. The device of claim 18, wherein the camera component receives the depth data in frames of data.

22. The device of claim 21, wherein the processor executes the computer executable instructions with respect to the receipt of the frames of data.

23. The device of claim 21, wherein an update rate for displaying the visual representation is at least 20 Hz.

24. The device of claim 18, wherein the computer executable instructions further comprise instructions for comparing the depth data to a target filter for target recognition, and if the comparison indicates an association with the target filter, labeling the target to associate with the target filter.

25. The device of claim 18, wherein the computer executable instructions further comprise instructions for:
tracking the target in the physical space by evaluating the depth data received that is representative of the target;
comparing the depth data from frame-to-frame to identify temporal information for updating the point cloud; and
updating the model of the target based on the temporal information,
wherein the temporal information comprises differences in the depth data between frames and a second surface extracted from the updated point cloud.

26. The device of claim 25, wherein the computer executable instructions further comprise instructions for using the temporal information to determine a confidence rating for the identified target in the physical space.

27. The device of claim 25, wherein an update rate for updating the model of the target is at least 20 Hz.

28. The device of claim 25, wherein the computer executable instructions further comprise instructions for using the temporal information to determine a confidence rating for the identified target in the physical space.

29. A method of target extraction, and tracking in a game application, the method comprising:
receiving raw data representative of a target in a physical space, wherein the raw data comprises depth data and RGB data;
interpreting the raw data into a set of points and determining surface normals from the set of points;
performing surface extraction on the target, wherein the surface extraction is determined from the set of points and the surface normals;
labeling the target with a unique ID in accordance with a tunable distance threshold and a tunable normal similarity threshold;
identifying color and/or texture associated with the at least one extracted surface based on an extraction of the at least one surface and the set of points;
performing color and/or texture extraction on the target comprising painting the color and/or texture onto a visual representation of the target; and
tracking the set of points by continuing to receive raw data and comparing the set of points from frame to frame; and
updating the visual representation of the target based on the tracking.

* * * * *